US010776978B2

(12) United States Patent
Holcomb

(10) Patent No.: US 10,776,978 B2
(45) Date of Patent: Sep. 15, 2020

(54) METHOD FOR THE AUTOMATED IDENTIFICATION OF REAL WORLD OBJECTS

(71) Applicant: Jeffrey W. Holcomb, Irving, TX (US)

(72) Inventor: Jeffrey W. Holcomb, Irving, TX (US)

(73) Assignee: Holcomb Technologies, L.L.C.

( * ) Notice: Subject to any disclaimer, the term of this patent is extended or adjusted under 35 U.S.C. 154(b) by 376 days.

(21) Appl. No.: 13/858,122

(22) Filed: Apr. 8, 2013

(65) Prior Publication Data

US 2014/0300597 A1    Oct. 9, 2014

(51) Int. Cl.
*G06T 17/20* (2006.01)
*G06T 13/40* (2011.01)
*G06K 9/00* (2006.01)
*G06K 9/46* (2006.01)

(52) U.S. Cl.
CPC .......... *G06T 13/40* (2013.01); *G06K 9/00201* (2013.01); *G06K 9/00369* (2013.01); *G06K 9/468* (2013.01)

(58) Field of Classification Search
CPC .... G06T 13/40; G06K 9/00201; G06K 9/468; G06K 9/00369
See application file for complete search history.

(56) References Cited

U.S. PATENT DOCUMENTS

| 7,103,229 | B2* | 9/2006 | Porikli | G06T 7/11 |
| | | | | 382/275 |
| 8,892,358 | B2* | 11/2014 | Ren | 701/454 |
| 2004/0249809 | A1* | 12/2004 | Ramani | G06F 17/30259 |

(Continued)

OTHER PUBLICATIONS

Agarwal, P.D., Shwarzkopf, O., Harir, M.: The Overlay of Lower Envelopes and its Applications, Disc. Comput. Geom. 15 (1996) 1-13.

(Continued)

*Primary Examiner* — Stephen S Hong
*Assistant Examiner* — Ahamed I Nazar

(57) ABSTRACT

A method is provided for the automated identification of real world objects. The invention, implementable via various means such as a processing system, method, or data structure in a recording medium such as memory or as a self-contained electronic circuit, has wide ranging applicability to numerous fields such as in a user interface for gaming systems, like Kinect, or immersive environments such as remote surgical operations, and other medical diagnostic applications. Similarly, our method can be utilized in artificial intelligence application for automated robotic identification of targets, such as drone assisted search and rescue missions, and the enablement of patent protection against unlawful replication on 3D printers. The method of the invention includes the steps of creating a 3D representation for the real world object to be identified, segmenting the newly created 3D representation according to potential identities, alignment of minimal, unique representations for said potential identities to the corresponding segments of the newly created 3D representation, and then the analysis of said alignments to determine which potential identity correctly identifies the real world object to be identified.

4 Claims, 10 Drawing Sheets

(56) References Cited

U.S. PATENT DOCUMENTS

| | | | |
|---|---|---|---|
| 2006/0067573 A1* | 3/2006 | Parr | G06K 9/00201 |
| | | | 382/154 |
| 2010/0149179 A1* | 6/2010 | de Aguiar | G06T 9/00 |
| | | | 345/420 |
| 2011/0148865 A1* | 6/2011 | Lim | G06T 13/40 |
| | | | 345/419 |
| 2013/0107003 A1* | 5/2013 | Lim | G06T 13/40 |
| | | | 348/46 |

OTHER PUBLICATIONS

Aurenhammer, F., Klein, R.: Votonoi Diagrams. Handb. Comput. Geom., Elsevier, (2000) 201-290.

Bowyer, A.: Computing Dirichlet Tessellations, The Computer Journal, vol. 24, No. 2 (1981) 162-166.

Held, M.: VRONI: An Engineering Approach to the Reliable and Efficient Computation of Voronoi Diagrams of Points and Line Segments, Computational Geometry, vol. 18, 2, (2001).

Held, M., Huber, S.: Topology-Oriented incremental Computation of Voronoi Diagrams of Circular Arcs and Straight-Line Segments, Computer-Aided Design 41 (2009) 327-338.

Watson, D. F.: Computing the n-dimensional Delaunay Tessellation with Application to Voronoi Polytopes, The Computer Journal, vol. 24, No. 2 (1981) 167-172.

\* cited by examiner

Fig. 9

<u>Algorithm for the reduction of a graph G to an acyclic graph, or tree</u>
Input: A graph G that may or may not be cyclic.
Input: Maximum cycle length $l_{max}$.
Input: Cycle detection function $\phi$.

```
1:   Q ← φ(G)
2:   For each cycle C∈Q where |C| > l_max
3:        for each vertex v∈C
4:             for each vertex u∈adj[v]
5:                  if u∉C
6:                       adj[v'].add(u)
7:                       adj[u].add(v')
8:                  end if
9:             end for
10:       end for
11:  end for
12:  for each edge e(v, u)∈C
13:       delete e(v, u) from G
14:  end for
15:  for each vertex v∈C
16:       delete v from G
17:  end for
18:  add v' to G
19:  return G
```

METHOD FOR THE AUTOMATED IDENTIFICATION OF REAL WORLD OBJECTS

REFERENCES CITED

U.S. Patent Documents

| | | | |
|---|---|---|---|
| 8,325,984 | A | December 2012 | Lee et al. |
| 7,974,443 | A | July 2011 | Kipman et al. |
| 8,295,546 | A | October 2012 | Craig et al. |
| 8,213,680 | A | July 2012 | Fitzgibbon et al. |
| 8,267,781 | A | September 2012 | Geiss et al. |

Other Publications

I. Baran and J. Popovic, "Automatic Rigging and Animation of 3D Characters," ACM Transactions on Graphics, vol. 26, July 2007.

S. Schaefer and C. Yuksel, "Example-based skeleton extraction," in Symposium on Geometry Processing, 2007.

N. Hasler, T. Thormahlen, B. Rosenhahn and H.-P. Seidel, "Learning skeletons for shape and pose," in ACM Symposium on interactive 3D graphics, 2010.

W. Chang and M. Zwicker, "Global registration of dynamic range scans for articulated model reconstruction," ACM Transactions on Graphics, vol. 30, pp. 15-26, 2011.

N. D. Cornea, D. Silver and P. Min, "Curve-Skeleton Properties, Applicaitons, and Algorithms," IEEE Transactions on Visualization and Computer Graphics, vol. 13, pp. 530-548, 2007.

Automated Object Identifier

TECHNICAL FIELD

This invention relates to the automatic identification and classification of real world objects via an analysis of virtual representation of said objects; where said representation is composed of any electronic, optical, or other medium for representing, storing, transmitting, or analyzing information about the original real world object. A component of this invention relates to the automatic rigging of 3D computer graphics.

BACKGROUND OF THE INVENTION

There has been a great deal of research into methods for the automatic identification of digital representations. These methods are as diverse as the digital representations that are to be identified. For example, text recognition software utilizes methods involving the computation of discrete local symmetries; Microsoft's Kinect utilizes probabilistic tracking in metric spaces; and there is an entire plethora of skeletonization methodologies that utilize everything from voxelization of 3D spaces to Reb graphs.

The method utilized by Microsoft's Kinect device is by far the most widely used and impressive to date. However, Microsoft's probabilistic tracking method requires a large amount of training data in order to produce a predictive model, and each new predictive model requires substantial, even international, efforts to construct. This will not work for many industries that wish to dynamically and automatically identify real world objects because they require a method that can completely recognize an object after one scan, and then be able to match said identity to any other instances of the object. Other industries that can benefit from our technology are not even interested in recognizing objects, but are instead interested in being able to completely analyze the object based off of a single representation, such as a CAD design, and then be able to draw conclusions from said analysis.

Voxelization, Reb graphs, and energy gradient methods do retain this ability to perform analysis or identification based off of a single frame, or data set; however, they are known to be highly error prone and pose specific. This means that it is difficult to ensure that an object will be accurately and uniquely identified from instance to instance. Similarly, if an object is identified in one instance, and then repositioned, then the voxelization, Reb graph, and energy gradient methods may not recognize the re-positioned real world object as the same object from the initial data acquisition.

SUMMARY OF INVENTION

This Summary is not intended to limit the scope of the claimed subject matter or identify key or essential features of the claimed subject matter. This Summary is only provided, in an abridged form, a selection of concepts that are further described in the Detailed Description.

With the previous paragraph in mind, this disclosure details a novel method for the identification of real world objects via the identification of a skeletal representation for the real world object. The identification of said skeletal representation is frequently, and generically, referred to as skeletonization. The goal of the skeletonization process presented herein is to create a representation that, at least in part, utilizes the least amount of information possible to represent the object which it is modeling so as to aid in the expediation of subsequent analysis. This is in contrast to many previous definitions of skeletal representations that often involve the identification of excess information that can lead to the obfuscation of the identity of the real world object to be identified.

As a side product of this method, we have also devised a novel automatic rigging method. This automatic rigging method resides at the core of our automatic object identification method.

The scope of this claim is not in any way intended to be limited to the identification of real world objects and includes, but is not limited to, the identification of virtual objects.

BRIEF DESCRIPTION OF THE DRAWINGS

Similarly numbered elements in the attached drawings correspond to one another.

FIG. 9 depicts an algorithm for the conversion of a cyclic graph into an acyclic graph.

DETAILED DESCRIPTION

The presented disclosure is directed at object identification and analysis. In particular, the use of an acquisition device such as a computed axial tomography (CT scan), radar, sonar, depth sensors, atomic force microscopy, or 3D scanning devices to acquire data representative of a real world object, where said representative data can then be analyzed to determine the identity of the said real world object. Similarly, the presented disclosure includes the use of the disclosed method to identify unknown virtual objects, such as a virtual cup, chair, or avatar, which represent potential real world objects, and to identify key components or sub-components of said virtual objects.

Figure 1:
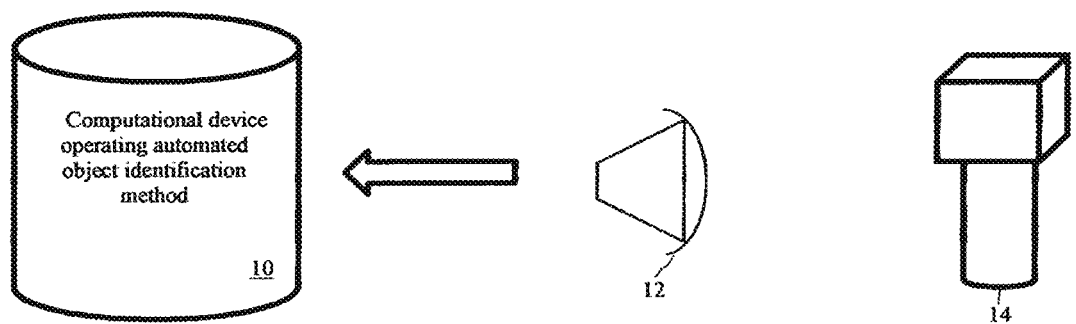
FIG. 1 depicts an example environment for an object identification system

FIG. 1 shows a non-limiting example of an object identification system for real world objects. In particular, FIG. 1 shows a recording device 12 that may or may not be a camera, depth sensor, radar or sonar based system, or any other device utilized to detect, quantify, and or measure real world objects, a square on top of a peg 14 as a generic example of an object that may exist in the real world, and a computational device 10, such as but not limited to a computer, that implements that object identification method. For identifying virtual objects and virtual object components and/or attributes the virtual object could be present on the computational device that is implementing the object identification method, or a replica of said virtual object could be sent to the computational device implementing the automated object identification method. An object identification system, such as the one shown in FIG. 1 may be utilized to identify one or more objects, such as the square on top of a peg 10 in FIG. 1, at a time.

Figure 2A:
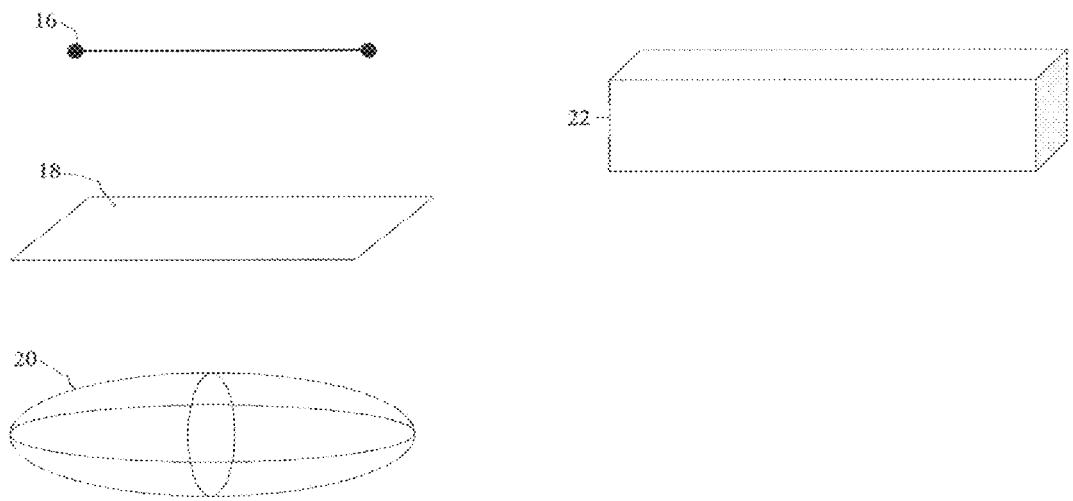
FIG. 2a depicts example components for a skeletal representation.

FIG. 2a shows a non-limiting set of examples for components of a skeletal representation. The first example 16 is a simple line segment bound by two points. The second example 18 is an unrestricted plane, the third example 20 is a spheroid, and the fourth example 22 is a rectangular box.

Figure 2B:
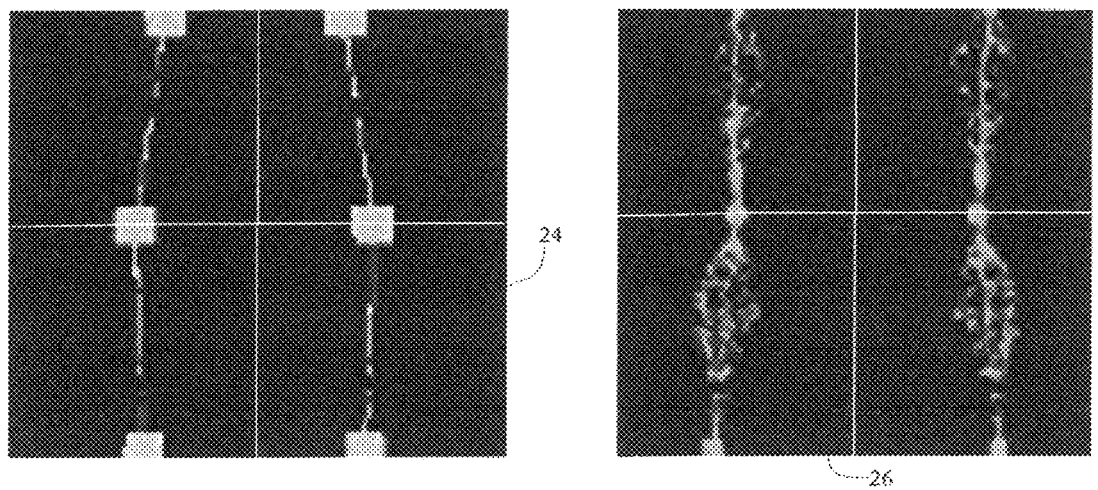
FIG. 2b depicts two example skeletal representations, as indicated by the projection of object data onto the surfaces of said skeletal representations.

FIG. 2b shows two examples of skeletal representations defined over four components. 24 shows a point cloud projection onto a skeletal representation defined over line segments. 26 shows an equivalent point cloud projection of the same point cloud onto spindle shaped components similar to that utilized during bone representation in computer graphics. See FIG. 7 for further details. The horizontal and vertical lines in 24 and 26 for FIG. 2b are the boundaries of the Voronoi diagram induced by the minimal representations partitioning of real space.

Figure 3:
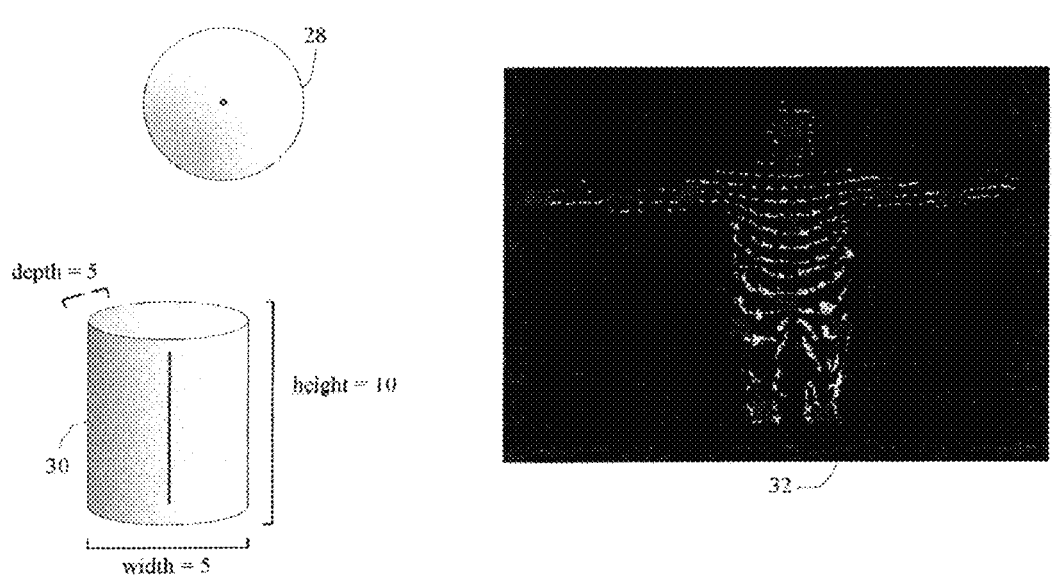
FIG. 3 depicts more examples of computed skeletal representations.

FIG. 3 shows examples of skeletal representations for a sphere 28, a cylinder 30, and a human 32: where said skeletal representation is the minimal amount of information required to identify an object. The concept of a skeletal representation presented herein is similar to the computer graphics concept of a skeleton; however, a skeletal representation seeks to only include the minimal amount of information necessary to accurately and faithfully represent the object in question within a topological scale $S:=[l_1, l_2]$ of representation: where said topological scale S is only able to detect attributes larger than $l_1$ and smaller than $l_2$. For more details on the difference between a skeleton and a skeletal representation see FIG. 4. In particular, 28 shows a sphere that could be, but is not limited to, a ball or a bearing; 30 depicts a cylinder that could be, but not limited to, a can of food or a child's building block; and 32 depicts a point cloud representation of a human male; where the skeletal representation in 32 includes a range $[l_1, l_2]$ that is unable to detect lower topological scale attributes such as fingers, toes, or facial features, but is large enough to detect arms, legs, torso, and the head. The topological scale S is in no way to imply a limit on the ability of the presented method to detect attributes or features of objects; virtual or real. On the contrary, if information about attributes and features at a lower/higher topological scale then all the user has to do is specify a new topological scale $S:=[l_1', l_2']$ such that S' is above, bellow, or overlaps S; depending on the newly desired topological scale. Similarly, said topological scale S is not intended to imply a required limit on the amount of information that is detectible. If a limit on the amount of information that is detectible is not desired then S can be defined as $S=[0, \infty]$.

For the sphere in 28, this skeletal representation is a single point at the center of the sphere. For the cylinder in 30, this skeletal representation is the line that represents the principle component that determines the height of the cylinder. For the human point cloud in 32, the skeletal representation is a 15-node tree.

Figure 4:
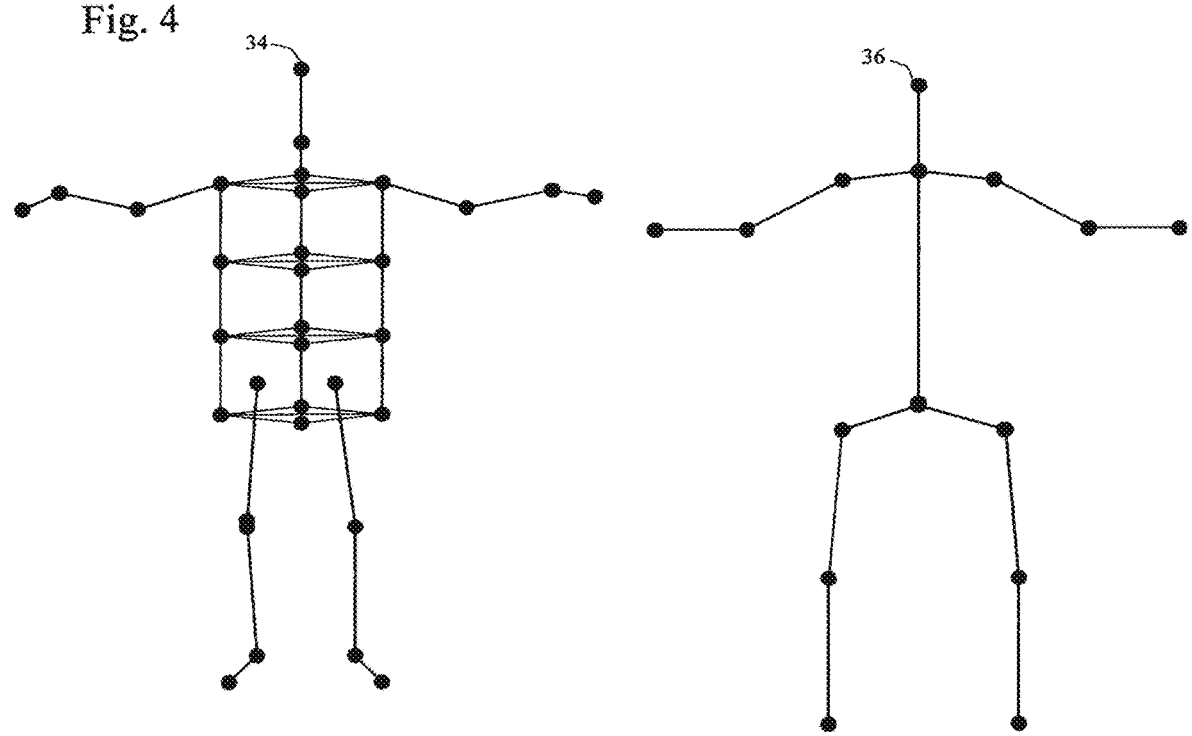
FIG. 4 compares a graphical skeleton with a skeletal representation.

FIG. 4 depicts a non-limiting example of the difference between a skeleton 34 and a skeletal representation 36. Both 34 and 36 depict a representation of a human form. 34 depicts a skeleton of a human form. 36 depicts an example of such a skeletal representation for a human form utilized by the method presented in this disclosure.

The concept of a skeletal representation is related, or similar, to the concept of a skeletal model or skeleton; where a skeletal model is a virtual specification of joints and other points of interest for a virtual model; and where said joints generally define the relative origin for a sub-graph, or component, of the overall virtual model. Different models may or may not require different skeletons in that not every model is defined over the same number or variety of sub-graphs or components.

There are two major differences between a skeleton 34 and a skeletal representation 36. The first is that a skeletal representation contains a topological scale that defines the lower bound and the upper bound for the size or significance of the attributes that are allowed to participate in or influence the skeletal representation. The topological scale S is a dimensional specification, such as but not limited to length, height, and width. As a non-limiting example, FIG. 3 depicts a cylinder 30 of length and width 5 units and of height 10 units. As such, the skeletal representation for the object in 30 must utilize a scale $S=[5, 10]$, or any scale that incorporates dimensional lengths in the range 5 to 10 units. Similarly, the feet and hands are missing in 36 while not in 34 because said feet and hands are below the topological scale that is detected for the skeletal representation in 36.

The second difference is that a graphical skeleton typically includes any information that was detectable to the algorithm utilized to generate said skeleton whereas a skeletal representation only includes the minimal amount of information necessary to identify an object. In 34 we can see that a lot more information, in the form of joint information, is utilized to represent the same shape as the skeletal representation in 36.

Figure 5:
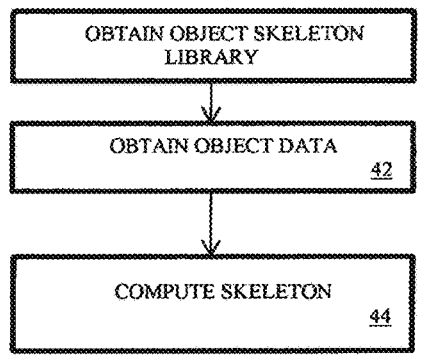
FIG. 5 depicts a high level view of the process of automatically identifying an object.

FIG. 5 depicts a high level view of a non-limiting example of a method for automatically determining the identity of an object, real or virtual. Step 40 involves the acquisition of a known library of potential skeletal representations or templates. See FIG. 6 for more details. Such a library can be obtained via methods such as, but not limited to, automatically via the use of various known skeletonization methodologies, followed by appropriate minimization and generalization methodologies, or via explicit definitions constructed by experts. Step 42 involves the acquisition of object data, such as but not limited to that depicted in 32. This object data can be, but is not limited to, data representative of virtual objects or real world objects that have been recorded or scanned into a computational or processing device. This object data is generally, but not necessarily, a 3D representation of some virtual or real object. Step 44 involves the computation of a skeletal representation from the object data. See FIG. 10 for more details.

Figure 6:
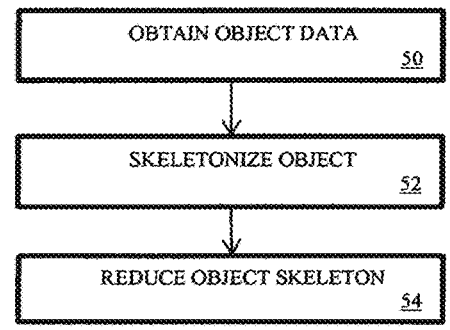
FIG. 6 depicts a method for deriving a skeletal representation form object data.
Figure 10:
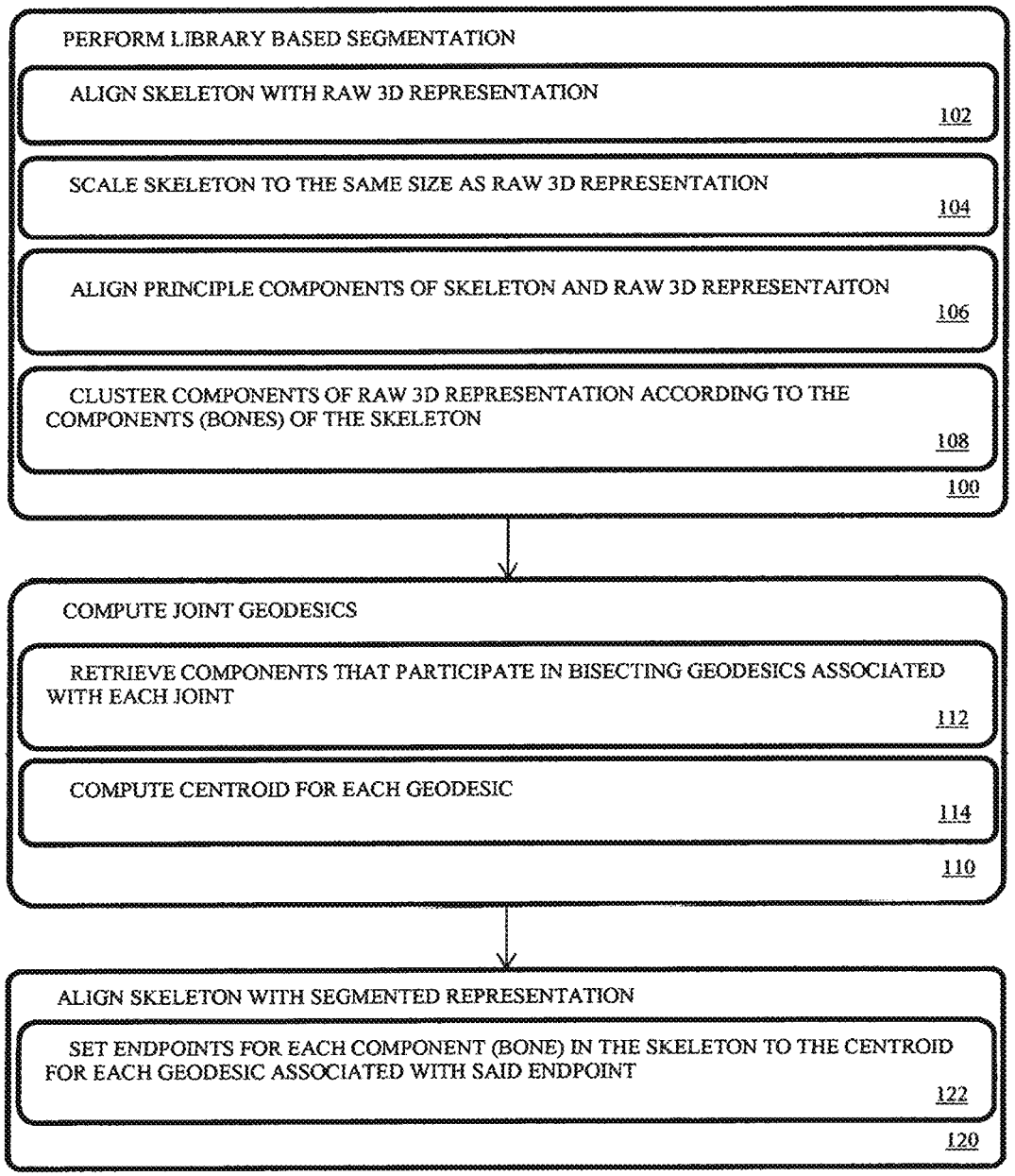
FIG. 10 presents more detail about the automatic rigging process that is performed during the automatic object identification (step 44 in FIG. 5).

FIG. 6 shows a non-limiting example of a method for deriving a skeletal representation. The purpose for the derivation of a skeletal representation in FIG. 6 is for, but not limited to, the automatic construction of an object library defined over a set of skeletal representations. In general, the method presented in FIG. 6 is slower than the method presented in FIG. 10, and therefore less desirable for circumstances in which the method in FIG. 10 is applicable.

Step 50 involves the acquisition of the data or information that is utilized to convey the characteristics of the object. This data is generally in the form of, but not limited to the form of, 3D information about the virtual or real object to be utilized for the computation of a skeletal representation.

Step 52 involves the computation of a skeletal representation for, or skeletonization of, the object represented by the data passed to this method in step 50. This skeletonization process can be performed utilizing any standard skeletonization methodology; for example, we could utilize, but are not limited to, thinning and boundary propagation methods, distance field methods, geometric methods, or general-field functions.

The final step in FIG. 6 is step 54. Step 54 involves the reduction of the skeleton computed in step 52 to a skeletal representation. For more details see FIG. 7.

Figure 7:
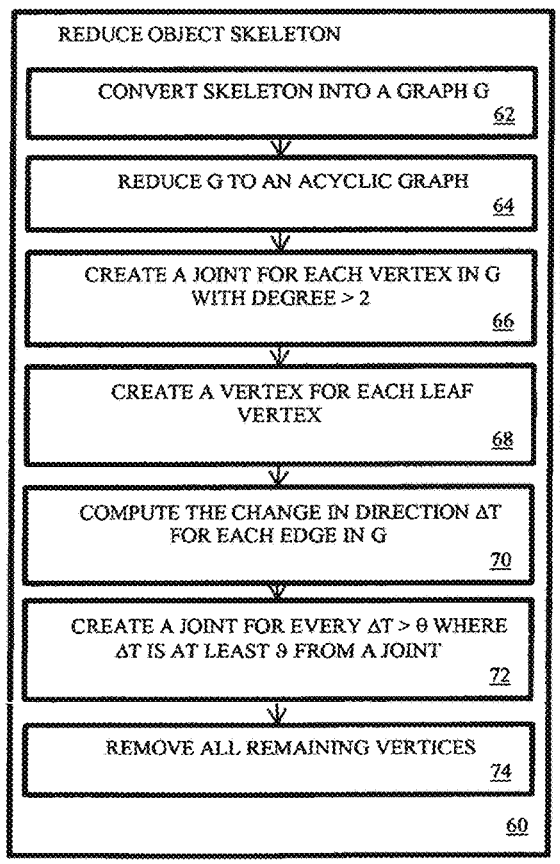
FIG. 7 depicts a method for reducing an object skeleton.

FIG. 7 provides further details on the reduction of a skeletal model K to a skeletal representation. Step 62 involves the conversion of the skeleton K computed in 52 to a graph G. Here, a graph is meant to indicate the mathematical construction that is composed of vertices, or points in space, and edges that connect said vertices to each other; where if the vertices u and v are in a graph G then u and v are connected to each other if and only if there exists an edge e(u, v) that connects the vertex u to the vertex v, and vice versa. This conversion involves the replacement of every point in the computed skeleton from 52 to a vertex in G, and the creation of an edge e(u, v) for every pair of points u,v∈K such that u is immediately adjacent to v and e is added to G.

Step 64 involves the reduction of G to an acyclic graph, or tree. An acyclic graph, or tree, G is meant to indicate the mathematical construct of a graph that does not contain a cycle; where a cycle is a path, or series of vertices, p in G such that the first and last vertex in p are the same vertex. Here, a path p is meant to indicate the mathematical construct that is defined over a series of vertices for a graph G, and such that if a vertex u immediately proceeds a vertex v in p then there exists an edge e(u, v) in G. One methodology for such a reduction is detailed in FIG. 9.

Step 66 involves the creation of a joint for the skeletal representation for every vertex of degree greater than two. As a non-limiting example, we can create joints by sequentially querying each vertex v in G to determine v's degree. If v's degree is greater than two then we can set a flag that designates v as a joint in the skeletal representation.

Step 68 involves the creation of a joint for the skeletal representation for every vertex of degree equal one. As in 66, a non-limiting example for such a process would be to query the degree for every vertex v in G. If the degree of said vertex v in G is equal to one then we can set a flag that designates v as a joint for the skeletal representation.

Steps 70 and step 72 together implement a search for a significant change in the direction d of the overall skeleton. 72 begins this search by computing the direction of the lines defined over each edge in G. As a non-limiting example, if u and v are joints in G, and p is the path in G from u to v, then the direction of every edge $e(x_1, x_2)$, where $x_1$ is closer to u than $x_2$, then the direction of e is computed as the vector subtraction $x_2-x_1$, for all pairs of vertices $(x_1, x_2)$ in the path p from u to v. The change in direction $\Delta T$ is then computed as the angular difference between the direction of two neighboring edges, or $\Delta T = \cos^{-1}(((x_2-x_1) \cdot (x_3-x_2))/(|x_2-x_1|\|x_3-x_2|))$. Alternatively, $\Delta T$ could be computed as $\Delta T = \sum_i^{i+r-2} \cos^{-1}(((x_{i+1}-x_i) \cdot (x_{i+2}-x_{i+1}))/((|x_{i+1}-x_i|\|x_{i+2}-x_{i+1}|))$ for some range r of edges; where $2 \leq r \leq i+r \leq |p|$, r is even, and where $i \geq 1$. The computed value for $\Delta T$ is then assigned to the vertex at location $i \lfloor r/2 \rfloor$.

Step 72 implements the second half of the search for significant changes in the direction of the overall skeletal model structure. Significant changes in the skeletal model structure can be detected by scanning the value of $\Delta T$ for each vertex $v_i$. If a value $\Delta T_i > \theta$ is detected then the index i of the vertex $v_i$ with said value for $\Delta T_i$ is temporarily stored. The values of $\Delta T$ for the subsequent vertex $v_{i+1}$ is then read. If $\Delta T_{i+1} \geq \Delta T_i$ then the value of $\Delta T_{i+1}$ is stored in the place of $\Delta T_i$. The process in step 72 continues in this manner until a value for $\Delta T_{i+1}$ is found such that $\Delta T_{i+1} < \Delta T_i$. Once a value for $\Delta T_{i+1}$ is found such that $\Delta T_{i+1} < \Delta T_i$ the values $d_1 = |v_i - v_1|$ and $d_2 = |v_{|p|} - v_i|$ are computed. If $d_1 > \partial$ and $d_2 > \partial$ then the vertex $v_i$ associated with $\Delta T_i$ is converted to a joint for the skeletal representation, as in 36.

Step 74 involves the removal of all of the remaining vertices. This is performed by visiting each remaining non-joint vertex v, where v participates in the two edges e(u, v) and e(v, w), removing v and the two edges e(u, v) and e(v, w) from G, and then adding the bi-undirected edge e(u, w) to G until only joints vertices remain in G.

FIG. 7 is only provided as an illustrative example of the method for the reduction of a generic skeleton to a skeletal representation. FIG. 7 is in no way meant to be interpreted as limiting, or to be the singular means for the derivation of a skeletal representation.

Figure 8:
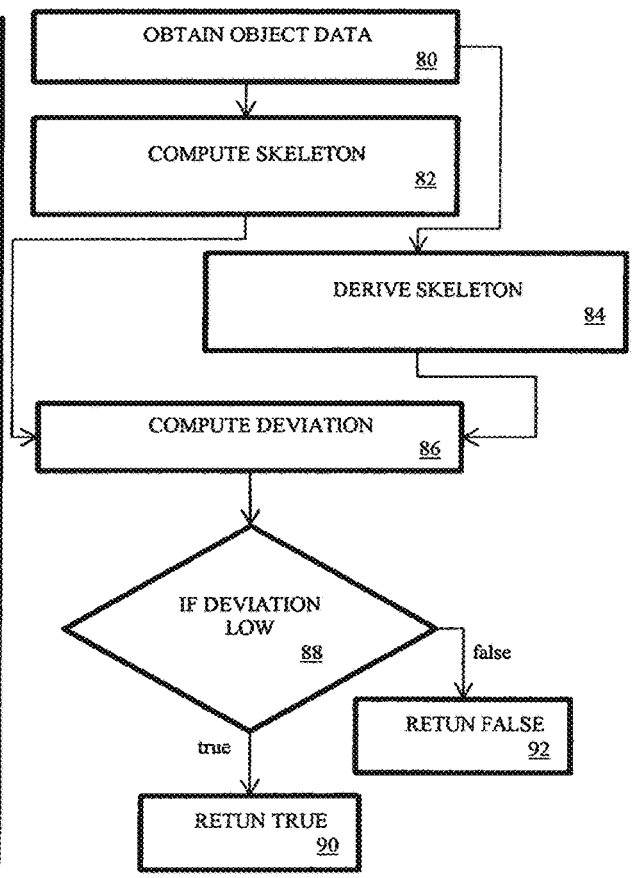
FIG. 8 depicts a method for the verification of a computed skeletal representation.

FIG. 8 details a non-limiting example of a method for the verification of a skeletal representation for a given object data set. Step 80 involves obtaining object data, such as in FIG. 1. Step 82 involves the computation of a skeletal representation from the object data and data stored in an object library. For more details see FIG. 11. Step 84 involves the derivation of a new skeletal representation as detailed in FIG. 6.

Step 86 involves the computation of the deviation from the computed skeletal representation in 82 and the derived skeletal representation in 84. The deviation in 86 is performed by aligning the skeletal representation form 82 with the skeletal representation from 84 and then computing the pair-wise deviation in location from the joints in the skeletal representation from 82 with the joints in the skeletal representation from 84. If the skeletal representation from 82 has more or less joints than the skeletal representation in 84 then a penalty will be applied for each joint in the skeletal representation from 82 but not found in 84, and vice versa.

Step 88 decides if the deviation between the two skeletal representations is high or low. If the deviation is low then the method in FIG. 8 returns "TRUE" to indicate that the computed skeletal representation is a valid representation for the object data. If the deviation is high then 92 returns "FALSE" to indicate that the computed skeletal representation is an invalid representation for the object data.

FIG. 9 provides further details on the algorithm for reducing a graph G to an acyclic graph or tree. The method presented in FIG. 9 takes as input an undirected graph G that may or may not be cyclic, a maximal cycle length $l_{max}$ and a cycle detection function $\phi$. The cycle detection function $\phi$ could be any of a number of widely known methods for the detection of cycles in a graph, including but not limited to breath-first-search and depth-first-search.

The algorithm in FIG. 9 begins by using the cycle detection function $\phi$ to compute and return a set of cycles from G. This computed set of cycles is then stored in a queue Q. Each cycle C in Q is then investigated to determine if its length is less than $l_{max}$. If the length of C is less than $l_{max}$ then a new vertex v' is created, and a new undirected edge e(v', u) is created for each vertex u that is connected to some vertex v∈C but that u∉C. After e(v', u) is created, e(v, u) is deleted form G.

Once the adjacency list for v' is constructed, all of the edges e(v, u) that participated in C are deleted form G. Similarly, every vertex v∈C is subsequently deleted from G. Finally, v' is added to G.

The algorithm in FIG. 9 serves as a non-limiting illustrative example for the elimination of cyclical components of general graphs in a manner that maintains the overall geometrical properties of the original graph. FIG. 9 is meant to imply an exclusively available approach. For example, we could easily modify the algorithm presented in FIG. 9 such that the deletions in lines 15 and 18 are performed after line 11. Many other such permutations of the algorithm presented in FIG. 9 are possible while maintaining the original concept of the proposed method.

FIG. 10 goes into further details about the core components of the object identification method presented in this claim. The core components are divided up into three main steps: library based segmentation 100, computation of joint polytopes 110, and alignment of skeletal representation with object data 130. The first major step involves the clustering of components, such as points, according to the geometrical properties of the skeletal representation retrieved from the object library in 40.

Step 100 is broken up into four sub-steps 102, 104, 106, and 108. The first sub step 102 involves the alignment of the skeletal representation from the library with the object data. This is done by computing the mean-deviation form for the object data and then aligning the origin of the object data with the origin of the skeletal representation retrieved form the object library.

Sub-Step 104 involves aligning the principle components of the skeletal representation with the principal components of the object data. This is performed by computing the principle components associated with the object data, and then aligning the principle components of the skeletal representation with the principle components of the object data, or vice versa, or both can be aligned with a pre-defined orientation for the principle components. For example, the first principle component can be aligned with the y-axis, the second principle component can be aligned with the x-axis, and the third principle component can be aligned with the z-axis. The number of principle components to be aligned is directly proportional to the dimensionality of the data passed in at 42.

Sub-Step 106 involves adjusting the size of the skeletal representation retrieved from the library to have the same size and proportions as the object data. This can be performed via simple scaling methodologies over multidimensional space.

Sub-step 108 involves the clustering of the primary components, such as points, of the object data according to the components, such as line segments, of the skeletal representation from the object library. This can be done by any number of methods, but the two most efficient are general least squares methods and Voronoi diagram methods.

As a non-limiting example, the least squares method for clustering can be formulated as follows. Let $S:=\{s_1, s_2, \ldots, s_n\}$ be the set of components for the skeletal representation retrieved from the object library in 40. Let $P:=\{p_1, p_2, \ldots, p_k\}$ be the set of components for the object data in 42. Let $\hat{p}_{j,i} \cong \text{Proj}_{s_j} p_i$ be the projection of component $p_i$ from P onto a component $s_j$ from S, and $r_{i,j}=|\hat{p}_{j,i}-p_i|$ be the residual after $p_i$ has been projected onto $s_j$. Then we can define the least squares equation $$\text{minimize } \Sigma_{j=1}^{n}\Sigma_{i=1}^{k}\phi(S,r_{j,i},p_i)r_{j,1}^2,$$

where $\phi(S, r_{j,i}, p_i)$ is the function $$\phi(S, r_{j,i}, p_i) = \begin{cases} 1 & \text{if } r_{j,i} = \min\{r \mid r = |proj_{s_j} p_i - p_i|, 1 \le j \le n\} \\ 0 & \text{if } r_{j,i} \ne \min\{r \mid r = |proj_{s_j} p_i - p_i|, 1 \le j \le n\} \end{cases}.$$

Using the above least squares method the object data can be clustered according to the geometric properties of the skeletal representation retrieved from the object library.

Step. 110 involves the computation of the bisecting polytope for each joint. 110 is divide up into two sub-steps. These bisecting polytopes can be utilized to align the components of the skeletal representation retrieved from the object library. A bisecting polytope is defined as the set B of components from P that are within A of the plane that bisects a joint $\varphi$ in the skeletal representation obtained in 40. The joint $\varphi$ is the intersection of two components $s_i, s_j \in S$. As such, the plane that bisects $\varphi$ is a hyperplane. This means that is the distance of a component $p_i$ ∈P to the hyperplane that bisects $\varphi$, and all components $p_i \in P$ within λ distance to said bisecting plane belong to the bisecting polytope $B_k$ associated with the joint $\varphi_k$.

Sub-Step 112 involves the retrieval of the bisecting polytope information for each joint. This can be done during step 100, or as a separate search after the completion of 100.

Sub-Step. 114 involves the computation of the centroid for each bisecting polytope $B_k$; where a centroid is the geometric center of mass for the bisecting polytope. The computation of the centroid can be done in the usual way.

Since the object data P is regarded as a set of uncorrelated data points, the centroid for $B_k=\{p_i, p_{i+1}, \ldots, p_{i+h}\}$ can be computed as $$\text{centroid}_k = (p_i, p_{i+1}, \ldots, p_{i+h})/h.$$

The computation of the centroid in 114 is only a non-limiting example of one way to compute the centroid for $B_k$; for there are many other equivalent methods for computing the centroid for $B_k$. Similarly, we could utilize the Euclidian center in 114 instead of the geometric center of mass.

Step. 120 only has one sub-step, and involves the actual alignment of the skeletal representation retrieved from the object library to the object data. This step involves updating the joint information for each intersection of a non-empty set of components from Sin 40 with the corresponding centroid computed in 122.

Figure 11:
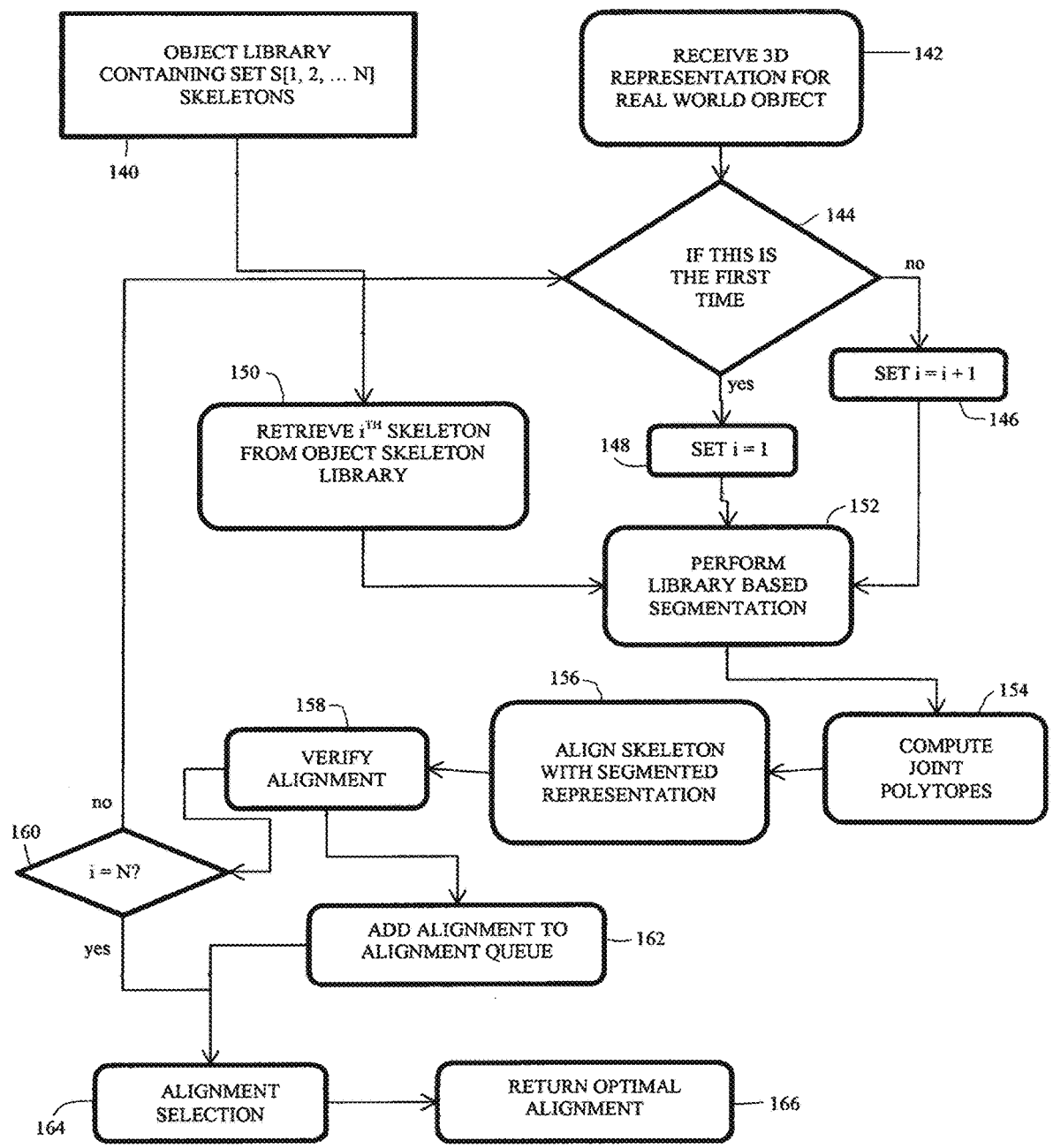
FIG. 11 presents a more detailed image of the method utilized for automatic object identification (step 44 in FIG. 5).

FIG. 11 details a method for the computation of an aligned skeletal representation for a provided set of object data. The fast computation of such an aligned, skeletal representation is critically important for the rapid identification of objects. While the method detailed in FIG. 11 specifically indicates a use in the identification of real world objects, FIG. 11 is only meant to serve as a non-limiting example of an implementation of the proposed method. The example detailed in FIG. 11 is for a serial implementation of the overall object identification method. To see information on a concurrent implementation see details in FIG. 12.

140 depicts a library of previously computed skeletal representations that can serve as a reference to be used in the acceleration of the computation of a skeletal representation for the currently unidentified object.

Step 142 indicates the acquisition of object data from a data source; specified in 14 as data representing a real world object. This object data acquisition can be performed as detailed in FIG. 1 and FIG. 5.

Step 144 involves a conditional that keeps track of the number of times that the main body of the method in FIG. 11 has been entered, or the number of example skeletal representations from the object library 140 that have been used by the method in FIG. 11. If this is the first time to enter the main method body then the iteration counter i is initialized to 1. If this is not the first time to enter the main method body then the iteration counter i is incremented by 1.

Step 150 involves the retrieval of a previously identified skeletal representation from the object library according to the value of the iterator i. This previously identified skeletal representation is then utilized by Step 152 to segment the provided object data. The segmentation performed in 152 is according to a least square analysis such that each point p in the provided data is assigned to the closest segment of the skeletal representation passed from 140; where said segmentation is performed after the skeletal representation from 140 has been scaled to the same size as the representation in the raw object data, and has been aligned with the representation in the raw object data.

Let $S=\{p_1, p_1, \ldots, p_k\}$ be the set of raw object data captured in 142, and $T=\{s_1, s_1, \ldots, s_1\}$ be the set of components to the skeletal representation retrieved from the object library in 150. Then the segmentation performed in 1152 is done by assigning a value $p_i$ from S to a component $s_j$ in T according to the equation $\min_d \{d(p_i, s_j) | p_i \in S \hat{} s_j \in T\}$; where $d(p_i, s_j)$ is the minimum Euclidean distance from a value $p_i$ to a component $s_j$.

Step 154 involves the computation of the joint polytopes associated with the intersection of the skeletal representation and the raw object data. A polytope is a geometric figure defined over a set of vertices. For the object identification method presented here, the raw data set S is mapped to a set of vertices to be utilized in the joint polytope. For each joint $j_i$ specified by the skeletal representation retrieved from the object library, a polytope is computed around said joint as the subset $S_i \subseteq S$ that is within a distance $\xi$ within the bisecting plane, or bisecting planes, of the components that intersect at the joint $j_i$.

Step 156 aligns the joints of the skeletal representation retrieved from the object library with the center of mass for the associated polytopes computed in step 154. This alignment can be done, but is not limited to, by computing the mean-deviation form of the polytopes computed in step 154 and then updating the joint values to reflect the shift of the joint polytope from the origin. Step 158 involves the verification of the validity of the computed skeletal representation in 154 and 156. For further information, see FIG. 8. At the end of the verification process in 158 the method in FIG. 11 adds the object data and the computed, aligned skeletal representation to an alignment queue 162 and then checks in 160 to see if the current iteration of the loop used the Nth skeletal representation from the object library. If it is not the Nth skeletal representation then the process will loop back to 144. If it is the Nth skeletal representation then the process will go to 164.

Step 164 involves the selection of the best computed skeletal representation. This selection is done by retrieving the computed skeletal representation that has the least amount of total deviation from the derived skeletal representation from 156. This best computed skeletal representation is then returned in 166.

Figure 12:
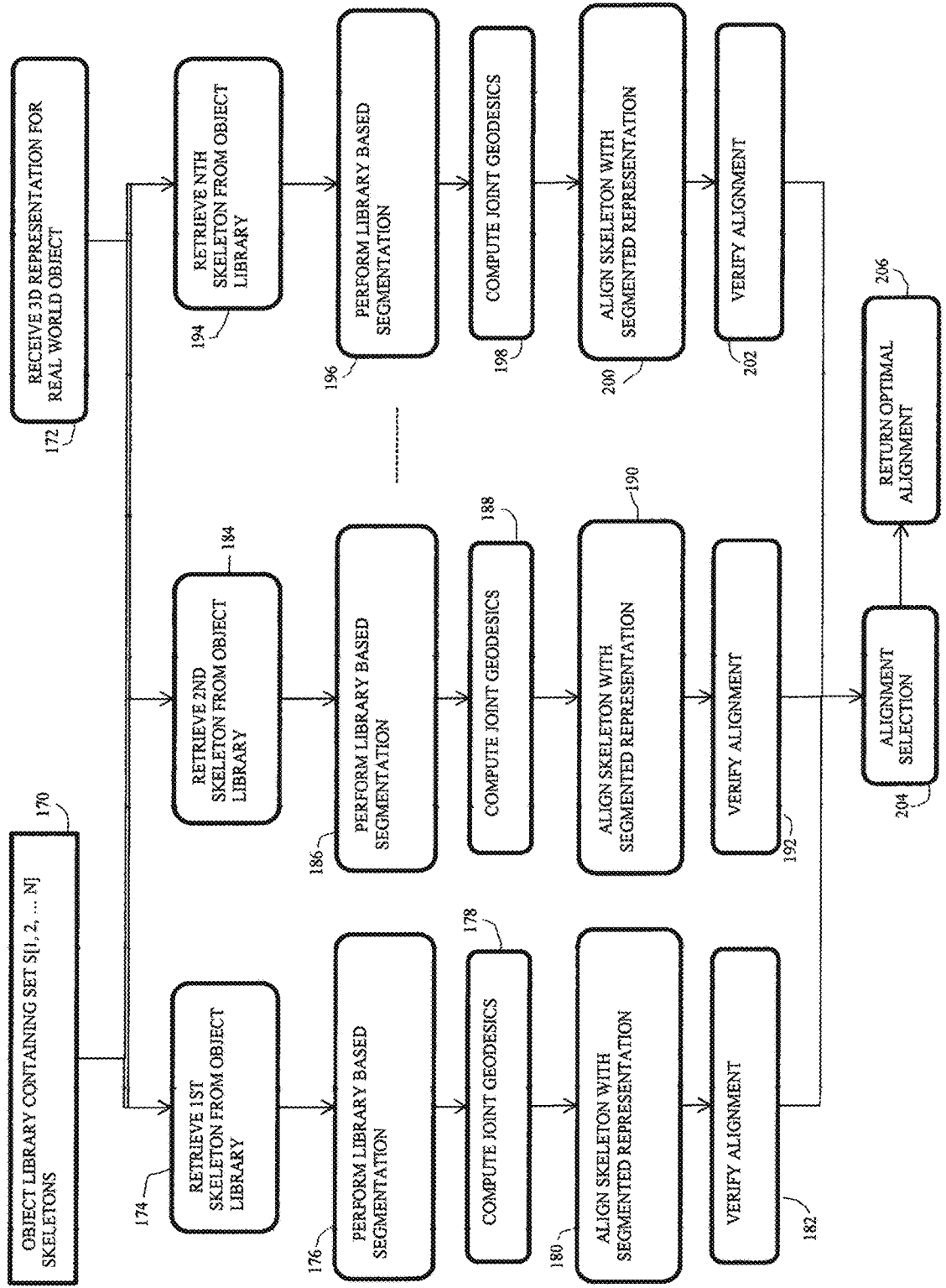
FIG. 12 presents a detailed image of a concurrent method for the automatic identification of objects (step 44 in FIG. 5).

FIG. 12 details a concurrent version of the method presented in FIG. 11. Both the serial method presented in FIG. 11 and the concurrent method presented in FIG. 12. are equivalent except that the serial method presented in FIG. 11 investigates the optimality of each object in the object library one at a time whereas the method presented in FIG. 12 has multiple, concurrent paths that simultaneously take unique skeletal representations from the object library to determine the fit of the chosen skeletal representation with the object data. FIG. 11 and FIG. 12 present two, non-limiting implementations for the object identification method presented here. There are many other possible implementations. For example, we could also utilize a tree structure to organize the object library, and then utilized a combination of n, iterative and concurrent calls to gradually increase the accuracy of the identification process.

Figure 13:
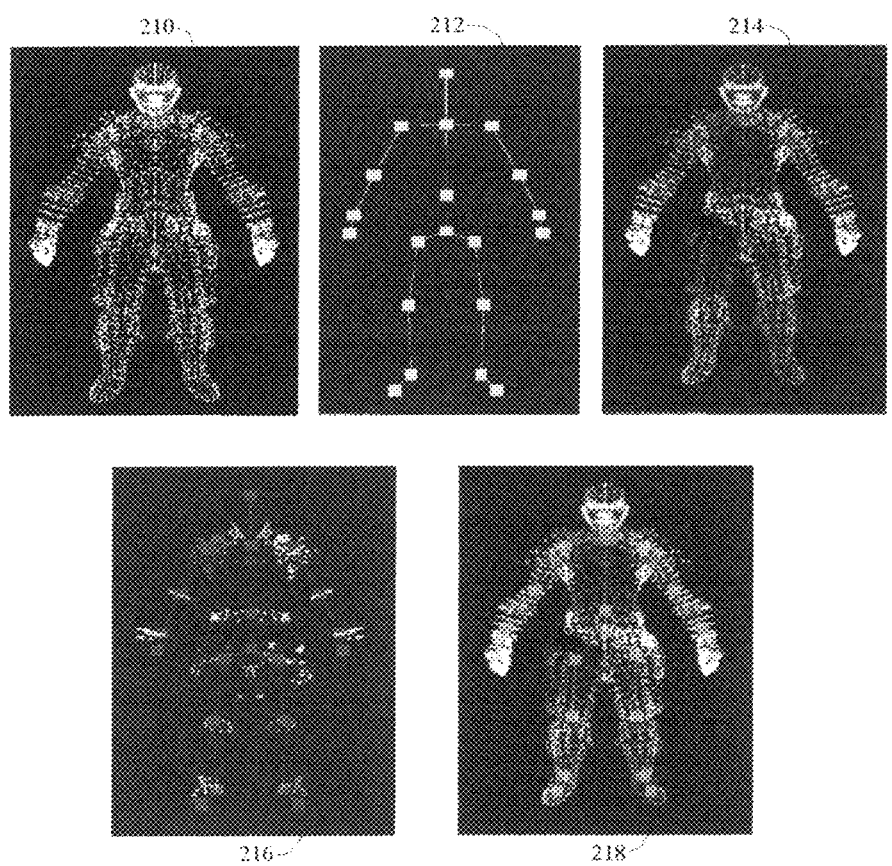
FIG. 13 presents a example of automatically rigging a mesh to a skeleton.

FIG. 13 shows a series of steps in computing the identity of a virtual object via a single skeletal representation. 210 is a point cloud representing the object data for a virtual object. 212 is a skeleton representing a single skeletal representation. 214 is a segmented point cloud, based on 212 and as computed in FIG. 11. 216 is the collection of bisecting polytopes associated with 214. 218 is the skeletal representation form 212 rigged to the point cloud from 210. Note that if only a single skeletal representation is paired with a single point cloud, or mesh, then the process described above is the same as a novel, fast automatic rigging method for a virtual object.

The preceding detailed description of the methodologies and technologies herein is meant for illustrative purposes and descriptive purposes. This description is not meant to be exhaustive or limiting of technologies disclosed with respect to the exact form presented in the detailed description. Many possible variations and alterations are possible in light of the material covered above. The examples detailed above were chosen in an effort to best explain the concepts and principles of the technologies discussed herein. It is intended that the scope of the technologies presented herein be defined and delineated by the claims appended hereto.

I claim:

1. A method of representing objects, the method comprising:
representing a to be represented object as an ordered collection of object components, each component comprising one or more portions, each portion represented by one or more points, each point represented as machine-readable data;
separately representing each to be represented object component over a plurality of scales, each scale defined over a range of values, such that a resolution of the to be represented object component is determined by a scale representation of the component, wherein each portion of each component represented at a particular scale is included or not according to what may be reproduced within the applicable scale;
obtaining a known object from an object library, the known object from an object library comprising a plurality of features;
obtaining components of the known object, each component of the known object represented at the same scale;
grouping the components of the to be represented object according to a working configuration of the known object from an object library;
selecting a minimal set of components of the to be represented object, the union of which minimal set of components corresponds to the plurality of features of the known object from an object library;
changing a size of the known object from an object library to correspond to the size resulting from the grouping of components of the to be represented object;
comparing the known object from an object library with the minimal set of components of the to be represented object by applying a minimization function to the compared known object from an object library, wherein applying a minimization function to the compared known object from an object library converts the known object to a connected graph and applies a single round least squares operation thereto;
associate by correspondence each point of each portion of the minimal set of components of the to be represented object with one or more data points of the known object from an object library after the known object from the object library has been processed by the minimization function;
using the associated points to orient the known object to the orientation of the to be represented object components;
wherein orienting the known object from an object library to the orientation of the to be represented object components comprises identifying intermediate data points of the known object from an object library as joint data points, identifying a center of mass of said joint data points by identifying intersections at the to be represented object components connected at respective joint data points, and moving said joint data points to the geocentric center of a bisecting polytope defined over each said intersection.

2. A method of automatically rigging skeletons, also referred to as skeletal representations, to models, the method comprising:
representing a model, also referred to as an object, as an ordered collection of skeletal components, each skeletal component comprising one or more portions, each portion represented by one or more points, each point represented as machine-readable data, where the totality of the skeletal components is also known as a skeleton;
obtaining a known skeletal representation of an object from an object library, the known representation skeleton form an object library comprising a plurality of features;
obtaining components of the skeleton;
grouping the components of the object according to a working configuration of the known skeleton from an object library;
changing a size of the known skeleton from an object library to correspond to the size resulting from the grouping of components of the object;
associate by correspondence each point of each portion of the skeleton of the object with one or more data points of the known skeleton from an object library after the known skeleton from the object library has been processed by a minimization function;
using the associated points to orient the known skeleton to the orientation of the object components;
wherein orienting the known skeleton from an object library to the orientation of the object components comprises identifying intermediate data points of the known skeleton from an object library as joint data points, identifying a center of mass of said joint data points by defining intersections between a line connecting data points, and moving said joint data points to the geocentric center of a bisecting polytope defined over each said intersection.

3. The method of claim 2, further comprising a method of automatically rigging a model also referred to as the to-be-rigged model, to a skeleton, also referred to as a skeletal representation or animation skeleton, the method comprising:
representing a model as:
a collection of meshes defined over a finite set of model point values, where a point value can be interpreted as a location in at least two-dimensional space, and a finite set of line segments that connect model points;
said collection of meshes collectively known as the to-be-rigged model mesh, or the to-be-rigged model meshes, a skeletal representation defined over a finite set of skeletal components called bones may be included in the model, but is not required to be included in the model; each skeletal component included in the model comprising one or more portions, each portion represented by one or more points, each point represented as machine-readable data, where the skeleton is defined over the totality of the skeletal components being utilized to represent an object, and various aspects of an object, where each skeletal component may, but is not required to be, represented by a line segment or ray;
and where, if a skeletal representation is defined, each point belonging to a mesh in a model is assigned to one or more skeletal components in the skeletal representation belonging to the model;
utilizing a model library, where the model library is composed of a finite set of models and structured such that a computational device can retrieve:
a single model and the identity of, or unique identifier for, the model;
a set of models and the identities of, or unique identifiers for, each model in the set of models;

the meshes from a model and the identity of, or unique identifier for, the model;

a set of meshes from a set of models and the identities of, or unique identifiers for, each model in the set of models;

the skeletal representation for a model and the identity of, or unique identifier for, the model;

a set of skeletal representations from a set of models and the identities of, or unique identifiers for, each model in the set of models;

obtaining a known skeletal representation of an object from the model library, the known skeletal representation from the model library comprising a plurality of skeletal components, or skeletal components;

obtaining skeletal components of the skeletal representation;

grouping the to-be-rigged model meshes according to a working configuration of the known skeletal representation from the model library;

changing a size of the known skeletal representation from the model library to correspond to the size resulting from the grouping of the meshes of the to-be-rigged model;

performing said rigging by:
  associating by correspondence each point belonging to the to-be-rigged model to one or more skeletal components, or bones, of a known skeletal representation from a known model belonging to the model library according to a minimization function such as a least squares fitting operation;
  using the associated points to orient the skeletal components, or skeletal components, of the known skeletal representation to the orientation of the to-be-rigged model meshes;

and wherein said rigging is performed by orienting the known skeletal representation from the model library to the orientation of the to-be-rigged model meshes, wherein said orienting is comprised of identifying intermediate data points of the known skeletal representation from the model library as joint data points, where said joint data points lie at the intersection of two or more skeletal components, identifying a center of mass of said joint data points by defining intersections between a line segment representation for the skeletal components connecting joint data points, and moving said joint data points to the geocentric center of a bisecting polytope defined over each said intersection.

4. The method of claim 1, further comprising a method of automatically identifying an object, also referred to as the to-be-identified object, the method comprising:

a machine readable representation of the to-be-identified object, where said machine readable representation is either supplied as a mesh, a point cloud, or some other machine interpretable form, such as a list of data values, that can be converted into a point cloud;

automatically rigging the object to a set of potential skeletal representations from a model library where:
  said rigging is performed by:
    associating by correspondence each point belonging to the to-be-rigged model to one or more skeletal components, or bones, of a known skeletal representation from a known model belonging to the model library according to a minimization function such as a least squares fitting operation;
    using the associated points to orient the skeletal components, or skeletal components, of the known skeletal representation to the orientation of the to-be-rigged model meshes;
  the model library is composed of a finite set of models and structured such that a computational device can retrieve models and their associated identities;

performing the object identification by evaluating the effectiveness of the automatic rigging performed according to the method of claim 3;

completing the object identification by returning the identity of, or unique identifier for, the model from the model library whose associated skeletal representation was chosen by the prior evaluation to be the identity for the supplied machine representation of the to-be-identified object.

* * * * *